(12) United States Patent
O'Neill, Jr. et al.

(10) Patent No.: US 8,180,970 B2
(45) Date of Patent: May 15, 2012

(54) LEAST RECENTLY USED (LRU) COMPARTMENT CAPTURE IN A CACHE MEMORY SYSTEM

(75) Inventors: Arthur J. O'Neill, Jr., Poughkeepsie, NY (US); Michael F. Fee, Cold Spring, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 12/035,906

(22) Filed: Feb. 22, 2008

(65) Prior Publication Data

US 2009/0216955 A1    Aug. 27, 2009

(51) Int. Cl.
G06F 12/00 (2006.01)
G06F 13/00 (2006.01)
G06F 13/28 (2006.01)

(52) U.S. Cl. ............... 711/136; 711/150; 711/E12.023; 711/E12.03; 711/E12.031; 711/E12.032

(58) Field of Classification Search .................. None
See application file for complete search history.

(56) References Cited

U.S. PATENT DOCUMENTS

| | | | |
|---|---|---|---|
| 5,684,976 A | 11/1997 | Soheili-Arasi et al. | |
| 5,873,119 A * | 2/1999 | Khandekar et al. | 711/169 |
| 6,240,489 B1 | 5/2001 | Durham et al. | |
| 6,279,086 B1 | 8/2001 | Arimilli et al. | |
| 6,324,617 B1 | 11/2001 | Arimilli et al. | |
| 6,343,344 B1 | 1/2002 | Arimilli et al. | |
| 6,721,856 B1 | 4/2004 | Arimilli et al. | |
| 2004/0117543 A1* | 6/2004 | Thomann et al. | 711/105 |
| 2008/0082796 A1* | 4/2008 | Merten et al. | 712/219 |

OTHER PUBLICATIONS

Patterson et al. "Computer Organization and Design: the Hardware/Software Interface", 1997, 1998, Morgan Kaufmann Publishers. 2nd edition, pp. 436-440.*
Jaluta, I. et al., "B-Tree Concurrency Control and Recovery in Page-Server Database Systems", ACM Transactions on Database Systems, vol. 31, No. 1, Mar. 2006, pp. 82-132.
Jouppi, Norman P., et al., "Improving Direct-Mapped Cache Performance by the Addition of a Small Fully-Associative Chache and Prefetch Buffers", IEEE, 1990, pp. 364-373.
Chappell, R.S. et al., "Microarchitectural Support for Precomputation Microthreads", IEEE, 2002, pp. 74-84.
z/Architecture: "Principles of Operation"; Sixth Edition, Apr. 2007, Publication No. SA22-7832-05, copyright IBM Corp. 1990-2007, p. 1-1218.

* cited by examiner

*Primary Examiner* — Edward Dudek, Jr.
*Assistant Examiner* — Matthew Chrzanowski
(74) *Attorney, Agent, or Firm* — Cantor Colburn LLP; John Campbell

(57) ABSTRACT

A two pipe pass method for least recently used (LRU) compartment capture in a multiprocessor system. The method includes receiving a fetch request via a requesting processor and accessing a cache directory based on the received fetch request, performing a first pipe pass by determining whether a fetch hit or a fetch miss has occurred in the cache directory, and determining an LRU compartment associated with a specified congruence class of the cache directory based on the fetch request received, when it is determined that a fetch miss has occurred, and performing a second pipe pass by using the LRU compartment determined and the specified congruence class to access the cache directory and to select an LRU address to be cast out of the cache directory.

15 Claims, 4 Drawing Sheets

LEAST RECENTLY USED (LRU) COMPARTMENT CAPTURE IN A CACHE MEMORY SYSTEM

BACKGROUND OF THE INVENTION

This invention relates generally to a method for least recently used (LRU) compartment, capture in a multiprocessor system, and more particularly to providing a method, system and computer program product for LRU compartment capture which reduces the number of latches necessary by performing a two-pipe pass pipeline operation.

The performance of a multiprocessor computer system having a pipelined associative cache subsystem is driven by the cache access time for processor requested data fetch operations. Conventionally, a fetch hit is when a processor requested data fetch finds the data it needs in the cache, thereby saving the time required to access the main memory. A fetch miss is when the processor requested data fetch finds the data it needs is not in the cache thereby requiring an additional delay to access the main memory or another cache. Thus, the cache access time for a fetch hit is related to the time required to pull the requested data out of the cache and return it to the requesting processor, and the cache access time for a fetch miss is related to the time required to pull the data from the main memory or another cache and return it to the requesting processor. It may also be necessary in the case of a fetch miss for a cast-out operation of existing data in the cache in order to create space for the data pulled from the main memory. A directory LRU array is a conventional method for a cache to retain frequently referenced data by having each fetch which hits, update its located directory compartment in the directory LRU array as "Most Recently Used" (MRU). In the pipeline, it is advantageous to perform an address directory lookup operation and the cache access as early as possible and to place the directory LRU array at a cycle after which time the address directory lookup result is available. Further, regarding the fetch miss operation, the cast-out operation is not a performance critical operation of the fetch miss operation, such that time as measured in the number of cycles during the pipeline process is not limited as long as the cast-out operation is completed prior to the returning of the requested data to the requesting processor. In a cache subsystem, especially one that is servicing concurrently multiple fetches from a multiple number of processors, it is desirable to pipeline the fetch operations in a manner that minimizes contention for the directory and cache resources. Furthermore, it is desirable to minimize the cache access time for each of the data fetch operations.

Thus, currently, a single pipe pass pipeline is performed where all of the operations associated with a fetch hit are performed in a single pipe pass. FIG. 1 illustrates cycles performed in a conventional single pipe pass pipeline of a multiprocessor system, and FIG. 2 illustrates a conventional single pipe pass pipeline method including fetch hit and miss operations for a cache in a multiprocessor system. As shown in FIGS. 1 and 2, at operation 100, a processor sends in a fetch request with a storage address of desired data into the pipeline and the processor data fetch request is received. From operation 100, the process moves to operation 110, where a first cycle C1 is performed where an address directory lookup is initiated to a congruence class of a line address targeted by the fetch request. The address tag and ownership state information of each entry associated with each compartment in that congruence class are read. From operation 110, the process moves to operation 115, where a second cycle C2 is performed, where the address tag and ownership state information read is used to determine if a fetch hit has occurred in the cache. That is, the processor fetch address is compared against each compartment entry value, and simultaneously compartment data in the cache for the specified congruence class is read in case a fetch hit occurs. From operation 115, the process moves to operation 120, where it is determined whether a fetch (i.e., directory hit) has occurred. If it is determined that a fetch hit has occurred the process moves to operations 125 and 130. If not, the process moves to operation 140. In operations 125 and 130, respectively, a third cycle C3 is performed where the directory LRU array is updated to indicate a MRU compartment based on the fetch hit results (see operation 125) and directory hit is indicated as a cache late select (see operation 130). The process then moves to operation 135 where in a fourth cycle C4, the data is returned to the requesting processor. On the other hand, if a fetch miss occurs at operation 120, the process move to operation 140, where in the third cycle C3, the directory LRU array is accessed to determined the LRU compartment, each directory compartment entry is staged down as one of the entries will have to be selected for the cast-out operation to make room for the data coming into the cache, and the cache access is cancelled. From operation 140, the process moves the operation 145, where in the fourth cycle C4, the LRU compartment is determined and used to select a staged directory address compartment to be output as the LRU address. From operation 145, the process moves to operation 150, where in a fifth cycle C5, the LRU address is loaded into a cast-out controller to proceed with an LRU cast-out operation, to thereby cast out the LRU data out of the cache.

In the conventional method described above, each entry of the directory is required to be staged down for three pipeline cycles (C2, C3 and C4) before a determination can be made from the LRU array as to which entry is the LRU entry and the cast-out controller can be loaded with the LRU entry. A cache directory utilizes a plurality of clock-controlled latches for timing of the cast-out operation. These latches represent latency boundaries between stages or cycles in the pipelined structure of the cache directory. In the conventional method, a large number of latches are required, where the total number of latches is equal to the address tag size multiplied by the number of compartments and the number of cycles to be performed.

It would be desirable to be able to efficiently perform a cast-out operation of data from the cache directory while reducing the number of latches necessary to perform the cast-out operation.

BRIEF SUMMARY OF THE INVENTION

An exemplary embodiment includes a two pipe pass method for least recently used (LRU) compartment capture in a multiprocessor system. The method includes receiving a fetch request via a requesting processor and accessing a cache directory based on the received fetch request, performing a first pipe pass by determining whether a fetch hit or a fetch miss has occurred in the cache directory, and determining an LRU compartment associated with a specified congruence class of the cache directory based on the fetch request received, when it is determined that a fetch miss has occurred, and performing a second pipe pass by using the LRU compartment determined and the specified congruence class to access the cache directory and to select an LRU address to be cast out of the cache directory.

Another exemplary embodiment includes a multiprocessor system having a plurality of processors, a system main memory, a system bus and a cache. The system further includes a cache directory organized by congruence classes and compartments, and includes a plurality of cache entries, an LRU array corresponding to each congruence class, and including LRU cache entries associated with each congruence class, and a compartment selector which receives a compartment associated with each cache entry and selects a compartment from the cache entries. Upon receiving a fetch request via a requesting processor of the plurality of processors, the cache directory is accessed, and a first pipe pass is performed to determine whether a fetch hit or a fetch miss has occurred in the cache directory, and when a fetch miss has occurred, an LRU compartment is determined using the LRU array associated with a specified congruence class, and a second pipe pass is performed by sending the LRU compartment determined to the compartment selector and using the LRU compartment and the specified congruence class to access the cache directory and to select an LRU address to be cast out of the cache directory.

A further exemplary embodiment includes a computer program product corresponding to the above-summarized method.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
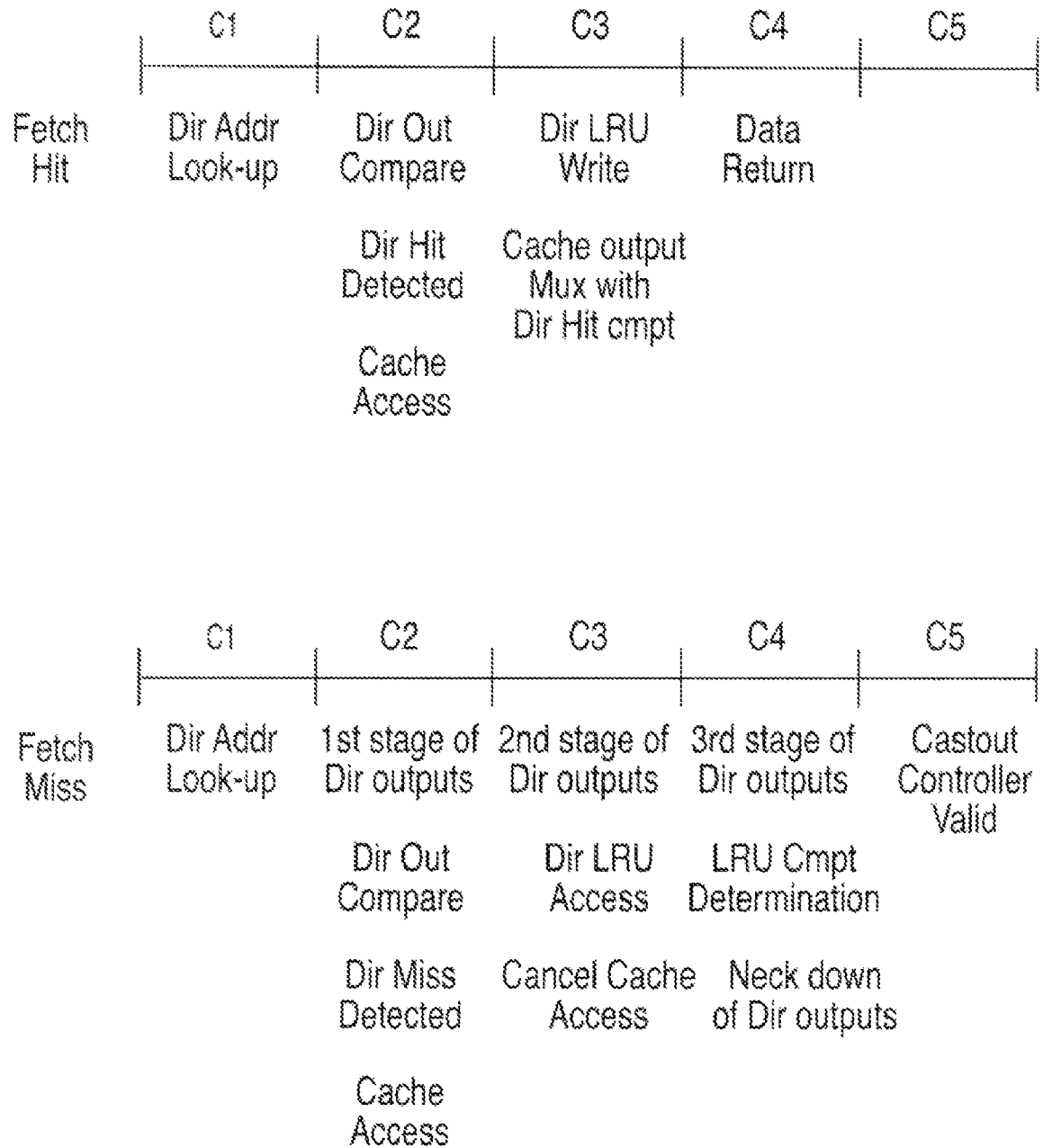
FIG. 1 is a chart illustrating cycles of a conventional single pipe pass pipeline of a multiprocessor system.
Figure 2:
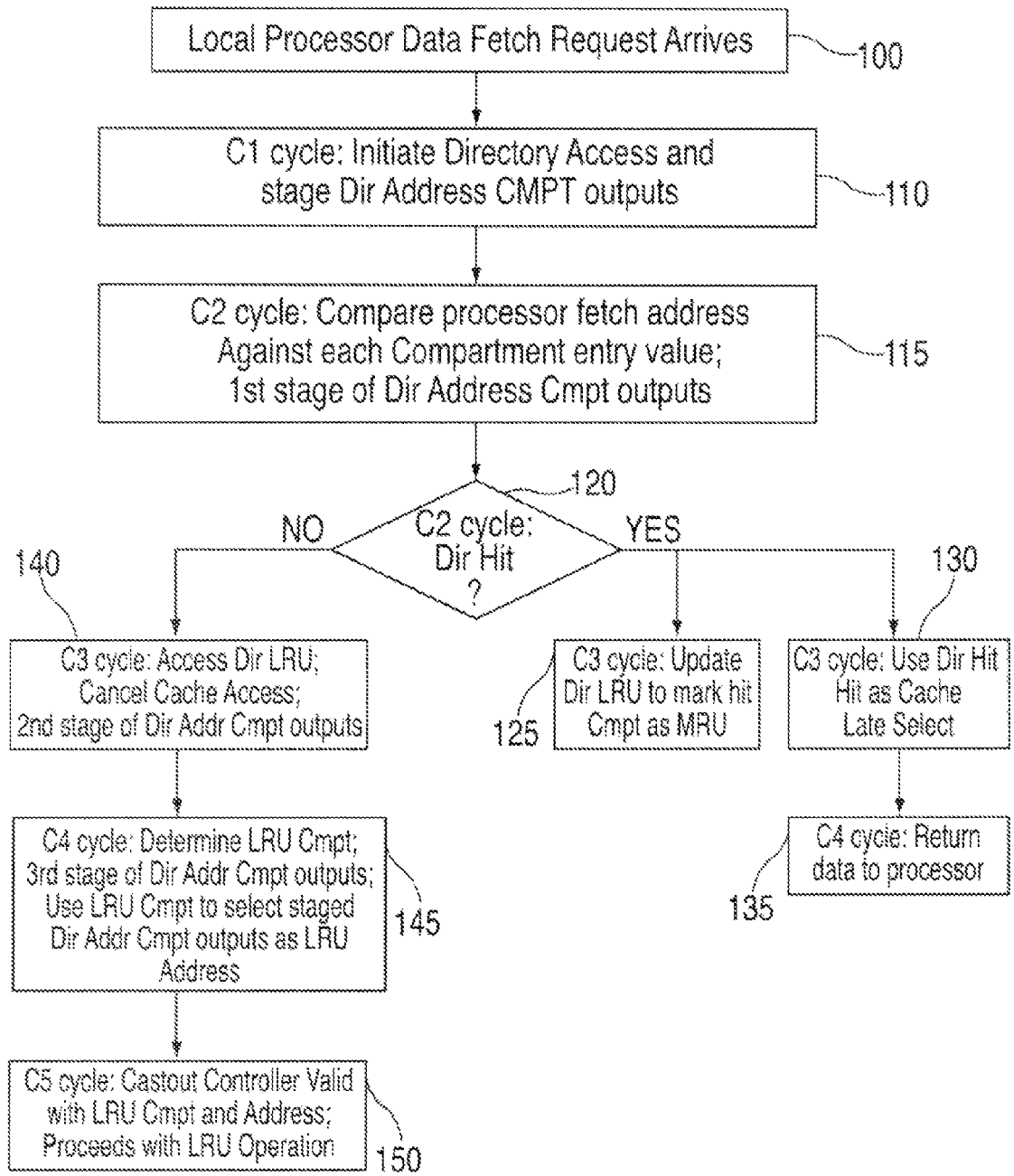
FIG. 2 is a flowchart illustrating a conventional single pipe pass pipeline method in a multiprocessor system.
Figure 3:
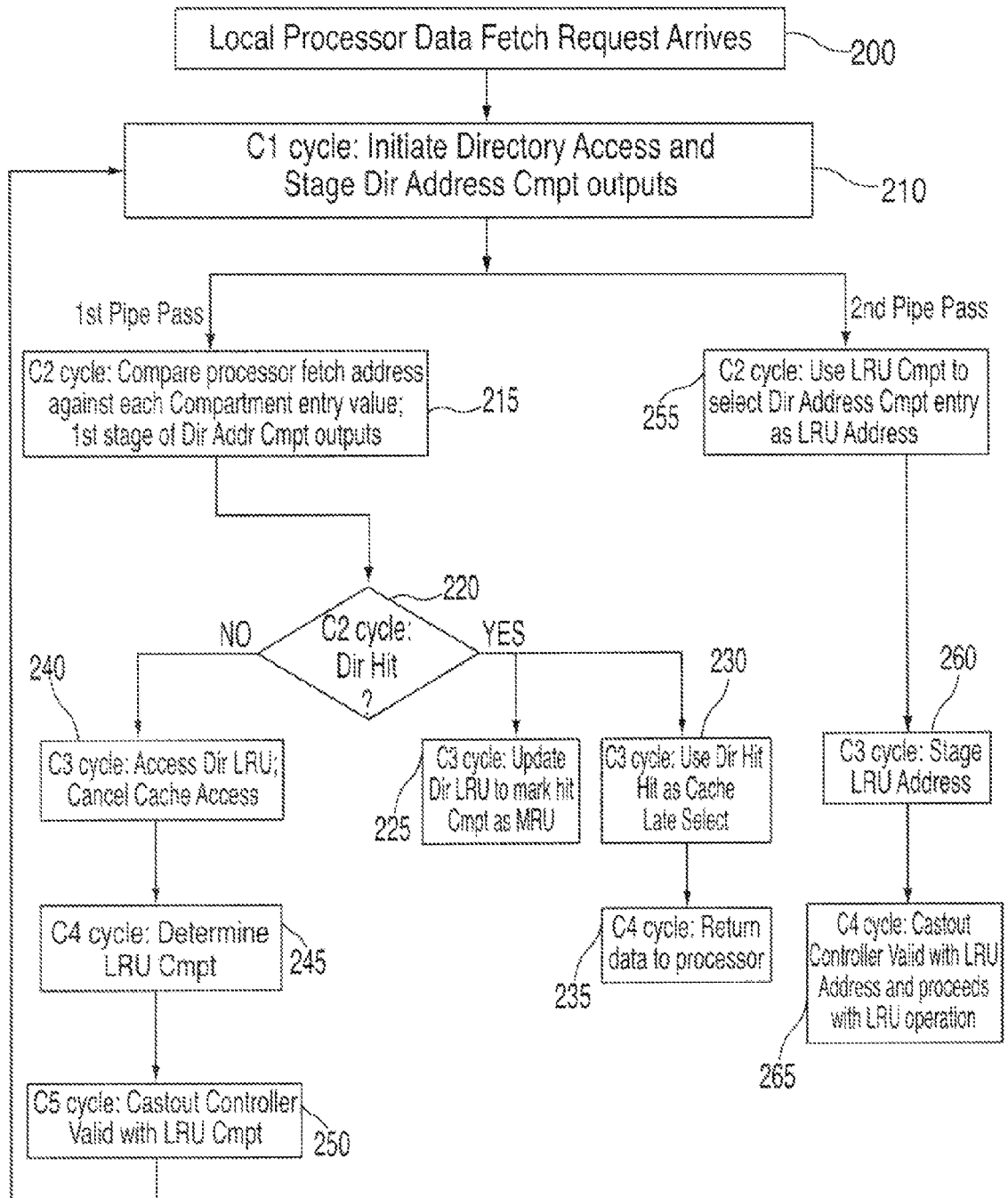
FIG. 3 is a flowchart illustrating a two-pipe pass pipeline method for LRU compartment capture that can be implemented within embodiments of the present invention.

Turning now to the drawings in greater detail, it will be seen that in FIG. 3 is a two pipe pass pipeline method for LRU compartment capture that can be implemented within embodiments of the present invention. As shown in FIG. 3, in operation 200, a processor sends in a fetch request with a storage address of desired data into the pipeline and the fetch request is received. From operation 200, the process moves to operation 210, where in a first cycle C1, the cache directory 300 (see FIG. 4, for example) is accessed and an address directory lookup is initiated to a specified congruence class of a line address targeted by the fetch request. The address tag and ownership state information of each entry associated with each compartment in the specified congruence class are read. From operation 210, the process moves to operation 215, to begin the performance of the first pipe pass in the two pipe pass method. In operation 215, in a second cycle C2, the address tag and ownership state information read is used to determine if a fetch hit has occurred in the cache. That is, the processor fetch address is compared against each compartment entry value, and simultaneously compartment data in the cache for the specified congruence class is read in case a fetch hit occurs. From operation 215, the process moves to operation 220, where it is determined whether a fetch hit (i.e., directory hit) has occurred. When it is determined in that a directory hit has occurred in operation 220, the process moves to operations 225 and 230, where in operation 225, in a third cycle C3, the directory LRU array 310 (see FIG. 4, for example) is updated to indicate that the hit compartment is the MRU compartment and in operation 230, the directory hit is indicated as a cache late select. From operation 230, the process moves to operation 235 where the data in the cache directory is returned to the requesting processor.

According to another exemplary embodiment, when it is determined that a fetch hit has not occurred at operation 220, that is, that a fetch miss (i.e., directory miss) has occurred, the process moves to operation 240, where in the third cycle C3, an LRU array is accessed and access to the cache directory is cancelled.

From operation 240, the process moves to operation 245, where in a fourth cycle C4, where an LRU entry is selected from the LRU array and an LRU compartment of the LRU entry associated with the specified congruence class of the cache directory is determined based on the fetch request received, and from operation 245, the process moves to operation 250, where in a fifth cycle C5, the cast-out controller is loaded with the LRU compartment. Operation 250 is the last operation of the first pipe pass operation in the two pipe pass method. From operation 250, the process begins the second pipe pass operation, by moving back to operation 210 where in the first cycle C1, the cache directory is accessed using the LRU compartment loaded in the cast-out controller at operation 250. From operation 210, the process now moves to operation 225, where in the second cycle C2, the LRU compartment along with the specified congruence class are used to select an entry as the LRU entry. From operation 255, the process then moves to operation 260, where in the third cycle C3, the LRU address of the LRU entry is staged down. From operation 260, the process moves to operation 265, where in the fourth cycle C4, the cast-out controller is loaded with the LRU Address and proceeds with the LRU cast-out operation.

Figure 4:
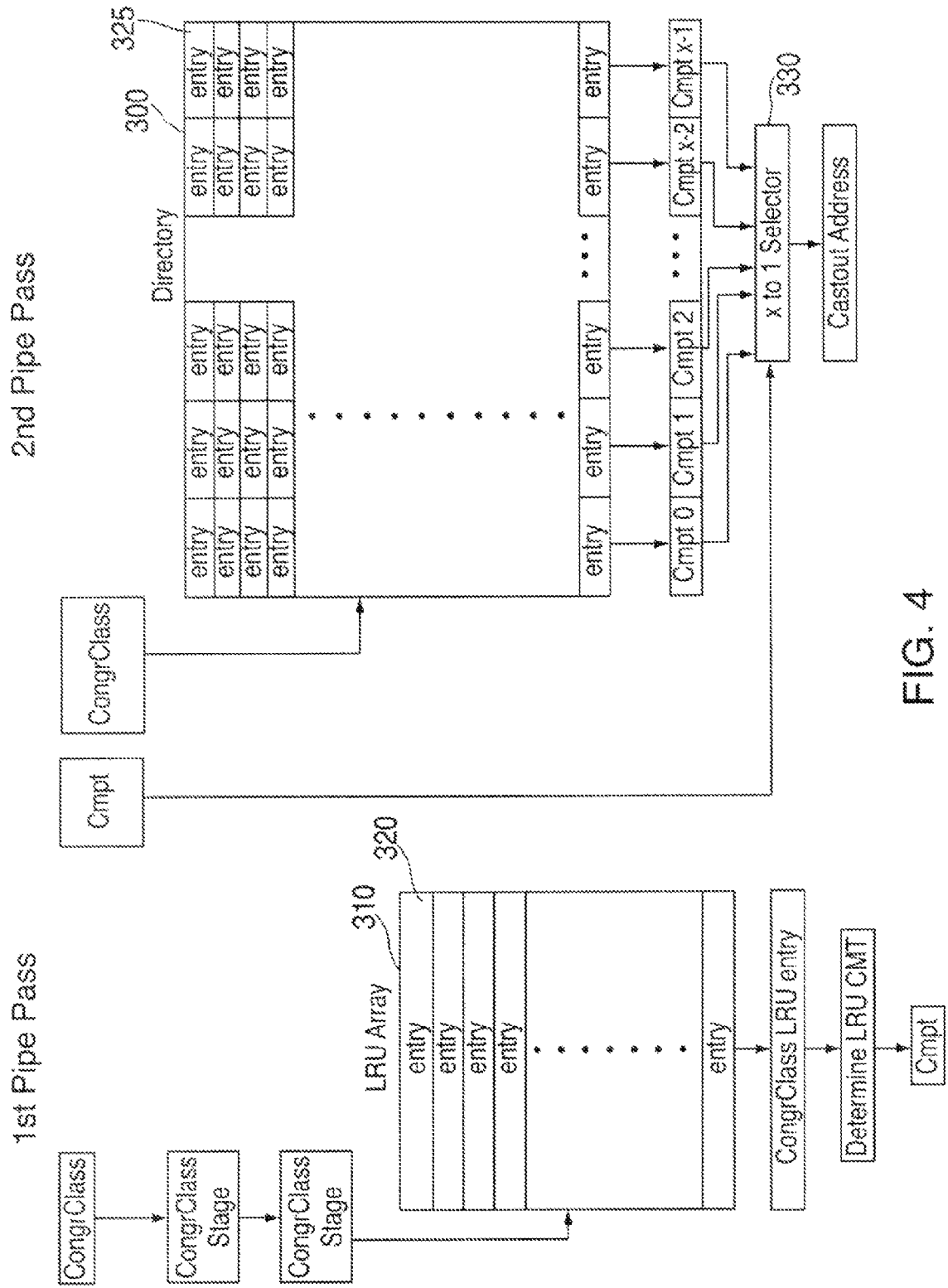
FIG. 4 is a diagram illustrating hardware components of a system implementing the method of FIG. 3, according to an exemplary embodiment of the present invention.

FIG. 4 is a diagram illustrating hardware components of a system implementing the two pipe pass pipeline method of FIG. 3, according to an exemplary embodiment of the present invention.

As shown in FIG. 4, in the current exemplary embodiment it is assumed that as a result of a fetch miss, data previously stored in the cache is to be cast out. As shown in FIG. 4, a multiprocessor system comprising a plurality of processors, a system main memory, a system bus and a cache. The system further comprises a cache directory 300 organized by congruence classes and compartments (ranging from 0 to X−1), and includes a plurality of cache entries 325. The system further comprises an LRU array 310 which corresponds to each congruence class, and includes LRU entries 320 associated with each congruence class, and a compartment selector 330 which receives compartment contents associated with each cache entry 325 and selects a compartment from the cache entries 325. Referring to FIGS. 3 and 4, upon receiving a fetch request via a requesting processor of the plurality of processors (see operation 200), the cache directory 300 is accessed, and a first pipe pass is performed (see operations 215 through operation 250). It is determined whether a fetch hit or a fetch miss has occurred in the cache directory, and when a fetch miss has occurred, an LRU compartment is determined using the LRU array 310 associated with a specified congruence class. Upon completion of the first pipe pass, a second pipe pass is performed (see operations 255 through 265) by sending the LRU compartment to the compartment selector 330 and using the LRU compartment and the specified congruence class to access the cache directory 300 and to select an LRU address to be cast out of the cache directory 300 and a controller (not shown) which receives and transmits operations relating to data within the cache memory, is loaded with the associated compartment along with the specified congruence class to determine the LRU address information to be cast out.

Technical effects and benefits include alleviating some of the silicon area and power increases in multiprocessor systems by reducing a significant amount of latches used for a cache cast-out (i.e., eviction) operation which normally is not performance critical, by separating the cast-out operation into two pipe passes.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
    performing, by a computer, a first pipeline pass comprising:
        receiving a fetch request from a requesting processor in a multiprocessor system;
        accessing a cache directory based on the received fetch request, the cache directory organized into congruence classes that are comprised of compartments containing cache entries;
        determining that a fetch miss has occurred in the cache directory;
        accessing a directory least recently used (LRU) array to determine a specified congruence class and a LRU compartment associated with a LRU entry in the cache directory; and
    performing a second pipeline pass comprising:
        receiving the LRU compartment and the specified congruence class; and
        accessing the cache directory to select an address of cache entry to be cast out of the cache directory, the selecting responsive to the LRU compartment and to the specified congruence class.

2. The method of claim 1, wherein the determining that a fetch miss has occurred comprises
    comparing a fetch address in the fetch request with a compartment value of each entry of a congruence class in the cache directory that is associated with the fetch address.

3. The method of claim 1, further comprising canceling access to the cache directory responsive to determining that a fetch miss has occurred.

4. The method of claim 1, wherein the performing a second pipeline pass further comprises:
    staging the selected address of the cache entry;
    loading a cast-out controller with the address of the cache entry to be cast out of the cache directory; and
    performing a cast-out operation of the address of the cache entry to be cast out of the cache directory.

5. The method of claim 1, wherein
    the directory LRU array is updated responsive to a directory hit occurring.

6. A computer program product comprising a storage medium readable by a processing circuit and storing instructions for execution by the processing circuit for performing a method comprising:
    performing, by a computer, a first pipeline pass comprising:
        receiving a fetch request from a requesting processor in a multiprocessor system;
        accessing a cache directory based on the received fetch request, the cache directory organized into congruence classes that are comprised of compartments containing cache entries;
        determining that a fetch miss has occurred in the cache directory;
        accessing a directory least recently used (LRU) array to determine a specified congruence class and a LRU compartment associated with a LRU entry in the cache directory; and
    performing a second pipeline pass comprising:
        receiving the LRU compartment and the specified congruence class; and
        accessing the cache directory to select an address of a cache entry to be cast out of the cache directory, the selecting responsive to the LRU compartment and to the specified congruence class.

7. The computer program product of claim 6, wherein the determining that a fetch miss has occurred comprises
    comparing a fetch address in the fetch request with a compartment value of each entry of a congruence class in the cache directory that is associated with the fetch address.

8. The computer program product of claim 6, wherein the method further comprises canceling access to the cache directory when a fetch miss has occurred.

9. The computer program product of claim 6, wherein the performing a second pipeline pass further comprises:
    staging the selected address of the cache entry
    loading a cast-out controller with the address of the address of the cache entry to be cast out of the cache directory; and
    performing a cast-out operation of the address of the cache entry to be cast out of the cache directory.

10. The computer program product of claim 6, wherein
    the directory LRU array is updated responsive to a directory hit occurring.

11. A system comprising a processor configured to perform a method comprising:
    performing a first pipeline pass comprising:

receiving a fetch request from a requesting processor in a multiprocessor system;

accessing a cache directory based on the received fetch request, the cache directory organized into congruence classes that are comprised of compartments containing cache entries;

determining that a fetch miss has occurred in the cache directory;

accessing a directory least recently used (LRU) array to determine a specified congruence class and a LRU compartment associated with a LRU entry in the cache directory; and performing a second pipeline pass comprising:
receiving the LRU compartment and the specified congruence class; and
accessing the cache directory to select an address of a cache entry to be cast out of the cache directory, the selecting responsive to the LRU compartment and to the specified congruence class.

12. The system of claim 11, wherein the determining that a fetch miss has occurred comprises comparing a fetch address in the fetch request with a compartment value of each entry of a congruence class in the cache directory that is associated with the fetch address.

13. The system of claim 11, wherein the method further comprises canceling access to the cache directory when a fetch miss has occurred.

14. The system of claim 11, wherein the performing a second pipeline pass further comprises:
staging the selected address of the cache entry
loading a cast-out controller with the address of the address of the cache entry to be cast out of the cache directory; and
performing a cast-out operation of the address of the cache entry to be cast out of the cache directory.

15. The system of claim 11, wherein the directory LRU array is updated responsive to a directory hit occurring.

* * * * *